US012776428B2

(12) United States Patent
Wang

(10) Patent No.: US 12,776,428 B2
(45) Date of Patent: Oct. 27, 2026

(54) INJECTION-MOLDED WIRE HARNESS AND MOLDING METHOD

(71) Applicant: Changchung JETTY Automotive Technology Co., Ltd., Changchun City (CN)

(72) Inventor: Chao Wang, Changchun City (CN)

(73) Assignee: CHANGCHUN JETTY AUTOMOTIVE TECHNOLOGY CO., LTD., Changchun City (CN)

( * ) Notice: Subject to any disclaimer, the term of this patent is extended or adjusted under 35 U.S.C. 154(b) by 904 days.

(21) Appl. No.: 17/995,526

(22) PCT Filed: Apr. 1, 2021

(86) PCT No.: PCT/CN2021/084898
§ 371 (c)(1),
(2) Date: Oct. 5, 2022

(87) PCT Pub. No.: WO2021/204054
PCT Pub. Date: Oct. 14, 2021

(65) Prior Publication Data

US 2023/0154650 A1 May 18, 2023

(30) Foreign Application Priority Data

Apr. 10, 2020 (CN) ........................ 202010283020.X

(51) Int. Cl.
*H01B 7/40* (2006.01)
*H01B 7/00* (2006.01)
(Continued)

(52) U.S. Cl.
CPC ............. *H01B 7/40* (2013.01); *H01B 7/0045* (2013.01); *H01B 13/06* (2013.01); *H01R 4/70* (2013.01);
(Continued)

(58) Field of Classification Search
CPC ........ H01B 7/40; H01B 7/0045; H01B 13/06; H01B 13/012; H01B 7/0009; H01B 7/17;
(Continued)

(56) References Cited

U.S. PATENT DOCUMENTS 3,780,446 A * 12/1973 Frimberger ........... B29B 13/065 406/142
3,834,038 A * 9/1974 Janda .................... B29B 13/065 219/686
(Continued)

FOREIGN PATENT DOCUMENTS

CN 104149770 U 11/2014
CN 204615126 U 9/2015
(Continued)

OTHER PUBLICATIONS

Machine Translation JP H06333433 (dated Dec. 2, 1994) (Year: 2025).*
(Continued)

*Primary Examiner* — Travis S Chambers
(74) *Attorney, Agent, or Firm* — Renner, Otto, Boisselle & Sklar, LLP

(57) ABSTRACT

An injection molded wire harness and a molding method. The wire harness includes a terminal and at least one conductor. One end of the terminal is connected to an electrical circuit of an electrical device, and the other end of the terminal is connected to the conductor. The wire harness is provided with a protective layer which is injection-molded and wraps the conductor, and at least one positioning device that is injection molded for fixing the position of the wire harness and/or at least one sealing device that is injection molded for waterproofing. The method can reduce manual operation, improve consistency of wire harness products,
(Continued)

reduce production cost of wire harness products, and prolong the service life of the wire harness.

20 Claims, 5 Drawing Sheets

(51) Int. Cl.

| | |
|---|---|
| ***H01B 13/06*** | (2006.01) |
| ***H01R 4/70*** | (2006.01) |
| ***H01R 13/52*** | (2006.01) |
| ***H01R 43/00*** | (2006.01) |
| ***H01R 43/24*** | (2006.01) |
| *B29C 45/14* | (2006.01) |
| *B29L 31/34* | (2006.01) |

(52) U.S. Cl.
CPC ....... *H01R 13/5205* (2013.01); *H01R 43/005* (2013.01); *H01R 43/24* (2013.01); *B29C 45/14639* (2013.01); *B29L 2031/3462* (2013.01)

(58) Field of Classification Search
CPC .......... H01B 13/22; H01B 13/32; H01R 4/70; H01R 13/5205; H01R 43/005; H01R 43/24; H01R 13/502; H01R 4/023; H01R 4/18; H01R 13/02; H01R 13/52; H01R 31/06; H01R 43/02; H01R 43/048; H01R 2201/26; B29C 45/14639; B29C 45/14598; B29C 45/14; B29L 2031/3462; B60R 16/0207; B60R 16/0222; B60Y 2410/115
See application file for complete search history.

(56) References Cited

U.S. PATENT DOCUMENTS

| | | | | |
|---|---|---|---|---|
| 4,074,362 | A * | 2/1978 | Kruder | B29C 48/767 366/82 |
| 9,831,590 | B2 * | 11/2017 | Onimoto | H01R 13/405 |
| 9,908,486 | B2 * | 3/2018 | Suzuki | H01R 43/24 |
| 2009/0186506 | A1 | 7/2009 | Chen et al. | |
| 2013/0213709 | A1 | 8/2013 | Kawamura et al. | |
| 2014/0317921 | A1 * | 10/2014 | Yamamoto | H01B 13/01209 29/856 |
| 2016/0087414 | A1 | 3/2016 | Satoh | |
| 2017/0187144 | A1 * | 6/2017 | Katsube | H01B 3/445 |
| 2017/0282464 | A1 * | 10/2017 | Stadler | H04R 1/1033 |
| 2019/0185659 | A1 * | 6/2019 | Yoshida | C08L 67/02 |
| 2023/0154650 | A1 | 5/2023 | Wang | |

FOREIGN PATENT DOCUMENTS

| | | | | | |
|---|---|---|---|---|---|
| CN | 204792091 | U | | 11/2015 | |
| CN | 105742928 | A | | 7/2016 | |
| CN | 205652083 | U | | 10/2016 | |
| CN | 107107413 | A | | 8/2017 | |
| CN | 107399284 | A | | 11/2017 | |
| CN | 207183650 | U | | 4/2018 | |
| CN | 208978782 | U | | 6/2019 | |
| CN | 111478060 | A | | 7/2020 | |
| CN | 211907700 | U | | 11/2020 | |
| DE | 1540461 | B1 | | 9/1969 | |
| DE | 7617838 | U1 | | 10/1976 | |
| DE | 102005005849 | A1 | | 8/2006 | |
| EP | 4135129 | A1 | | 2/2023 | |
| JP | H06333433 | A | * | 12/1994 | B29C 33/0044 |
| JP | H0710672 | U | | 2/1995 | |
| JP | 2595039 | Y2 | * | 5/1999 | |
| JP | 11136834 | A | | 5/1999 | |
| JP | 2004206890 | A | | 7/2004 | |
| JP | 2005332607 | A | | 12/2005 | |
| JP | 2010233371 | A | | 10/2010 | |
| JP | 5043170 | B2 | | 10/2012 | |
| JP | 2013012396 5 | | | 1/2013 | |
| JP | 2013183498 6 | | | 9/2013 | |
| JP | 2015154569 7 | | | 8/2015 | |
| JP | 2019204781 8 | | | 11/2019 | |
| JP | 7462067 | B2 | | 4/2024 | |
| KR | 20190081692 | A | | 7/2019 | |
| WO | WO-2012137679 | A1 | * | 10/2012 | H02G 3/04 |
| WO | WO-2013022117 | A1 | * | 2/2013 | H01R 13/521 |
| WO | 2021204054 | A1 | | 10/2021 | |

OTHER PUBLICATIONS

Office Action and Search Report issued on Apr. 24, 2025, for counterpart Brazilian Patent Application No. BR 112022020340-3.
Second Office Action and Search Report issued on Jun. 11, 2025, for counterpart Canadian Patent Application No. 3173649.
First Office Action issued on Jun. 25, 2025, for counterpart Mexican Patent Application No. MX/a/2022/012675.
Communication pursuant to Article 94(3) EPC dated Jul. 18, 2024, for European Application No. 21785050.2.
Office Action dated Apr. 24, 2024, for Vietnamese Application No. 1-2022-07207.
First Office Action issued Dec. 31, 2024, for Chinese Application No. 202010283020.X.
Search Report issued Dec. 31, 2024, for Chinese Application No. 202010283020.X.
Communication pursuant to Article 94(3) EPC dated Feb. 27, 2025, for European Application No. 21785050.2.
Office Action issued for corresponding Japanese National Stage Application No. 2022-560354, mailed Apr. 25, 2023.
The Supplementary search report issued on Jul. 17, 2025 for counterpart Chinese patent Application No. 202010283020.X, and its English machine translation.
The Third Office Action issued on Sep. 2, 2025 for counterpart European patent Application No. 21785050.2.
Examination Report dated Mar. 5, 2024, for Canadian Patent Application No. 3,173,649.
Request for Submission of an Opinion dispatched Apr. 19, 2024, for Korean Patent Application No. 10-2022-7038072.
International Search Report mailed Jun. 24, 2021, for priority International Patent Application No. PCT/CN2021/084898.
Extended European Search Report dated Oct. 10, 2023, for corresponding European Patent Application No. 21785050.2.
Notice of Reasons for Refusal dated Sep. 27, 2023, for corresponding Japanese Patent Application No. 2022-560354.
Office Action and Search Report issued on May 5, 2026 for counterpart BR patent Application No. BR 11 2022 0203403
The Fourth Office Action issued on Apr. 10, 2026 for counterpart European patent Application No. 21785050.2.

* cited by examiner

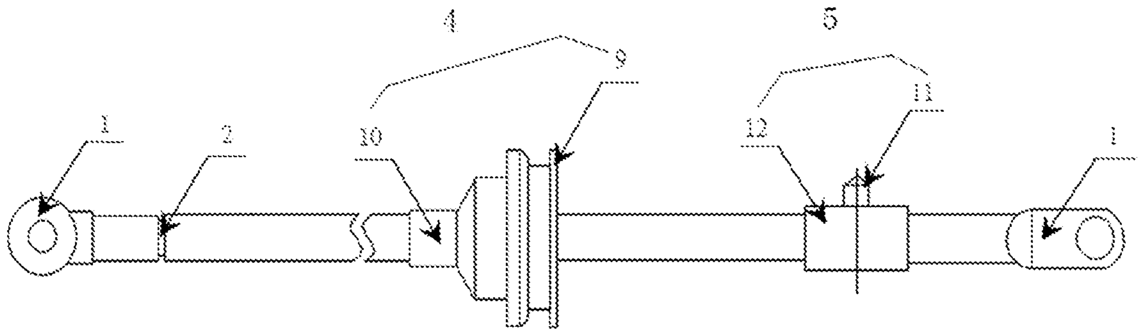
FIG.1
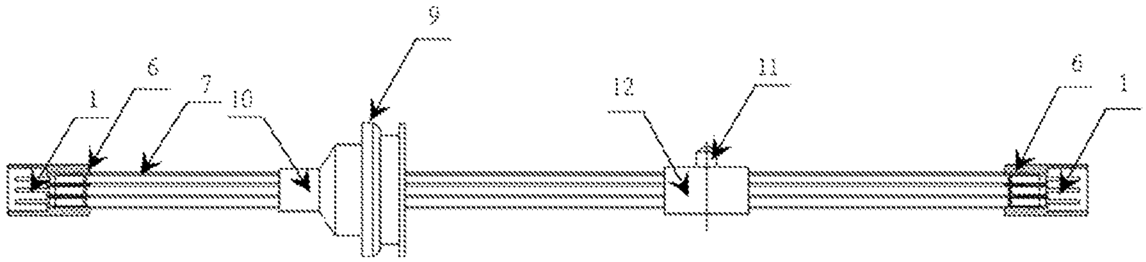
FIG.2
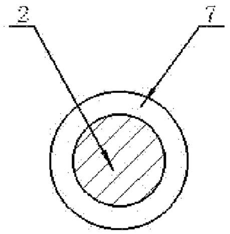
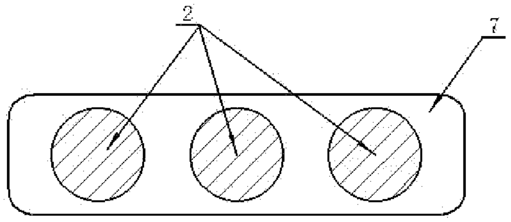
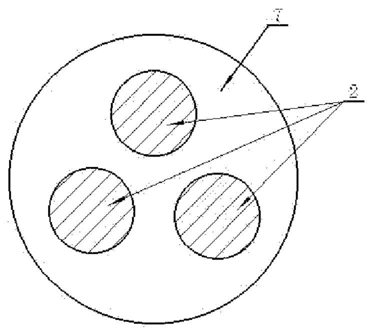
FIG.3A
FIG.3B
FIG.3C

INJECTION-MOLDED WIRE HARNESS AND MOLDING METHOD

RELATED APPLICATION

The present application is a National Stage of International Application No. PCT/CN2021/084898, filed Apr. 1, 2021, which claims priority to Chinese Patent Application No. 202010283020.X, filed on Apr. 10, 2020, and entitled "Injection Molded Wire Harness and Molding Method".

TECHNICAL FIELD

The present disclosure relates to the technical field of wire harness, and in particular to an injection molded wire harness and a molding method.

BACKGROUND

In the field of electrical connection, wire harness serves as a bridge for electrical circuit connection, connects a power supply and electrical appliances, and connects appliances for exchanging data, so wire harness is an important component in an automobile, an aircraft, a ship, various household appliances and equipment.

The wire harness is constructed in a variety of ways and materials, but the main structure is composed of cables, terminals, sheaths, fixing devices, waterproof devices and the like, and wherein the cable is composed of a conductor and an insulation layer wrapped around the conductors. At present, the processing technology of the wire harness is complicated, including cutting, peeling, terminal pressing, welding, pipe threading, blind plugging, terminal plugging, sheath plugging, sub-assembly, wiring, glue wrapping, branch fixing, device installation and positioning, part installation, conduction, appearance inspection, packaging and the like. Among these processes, the sub-assembly, the wiring, the glue wrapping, the branch fixing, the device installation and positioning, and the part installation occupy main working hours of wire harness production, and are operated manually at present, rather than by automatic production equipment. This results in high failure rate, high production cost, and inability to guarantee consistency of products, which has become a bottleneck of development of the wire harness industry. In the conventional wire harness processing technology, there are two methods for installing the positioning device of the wire harness, that is, a method of fixing with an adhesive tape and another method of fixing with a tie tape. However, both of the methods have the disadvantages of inaccurate installation size and easy falling off of the positioning device. Moreover, in the conventional wire harness processing technology, a sealing device of the wire harness is made of rubber and needs to be spread out before installation to ensure it can pass through the cable and can be fixed. In order to ensure sealing effect, cement and sealant have to be added between the sealing device and the cable, which complicates the process, and causes the sealing device to be easily damaged, resulting in the failure of the sealing function.

In addition, the various parts of the conventional wire harness, including the cable and a protective sleeve thereon, are not tightly coupled, wherein the cable is connected to the sheath through the terminal, the positioning device is fixed by the adhesive tape or the tie tape, the waterproof device is attached to the wire harness by the elasticity of a rubber member, and the like. In long-term use, the connection of the various parts will gradually fail, which results in wear of the cable and the protective sleeve, disengagement of the cable from the sheath, inaccurate or detached positioning of the device, and break or detachment of the waterproof device, and thus the functions of the parts are lost, resulting in the failure of the wiring harness, which can cause an accident in a serious case.

Therefore, at present, the wire harness industry is in an urgent need of a new method that can simplify the wire harness assembly and production process, reduce manual operation, improve product consistency, and reduce product production cost.

To this end, a Chinese Patent Application CN 104149770 A discloses an injection molded anti-lock brake system sensor wire harness, in which an injection molding positioning member is added on the basis of the original signal transmission cable. However, it is only for the sensing wire harness of the anti-lock braking system, and has limitations in use. In this patent application, finished cables need to be purchased and then are processed into the wire harness main body, which cannot save the cost of the wire harness. In addition, the cable is not under protection, and after being installed into the vehicle for use, the insulation skin of the cable may be damaged due to vibration and friction of the installation site, which may lead to short circuit in serious cases and lead to a burning accident. Moreover, in this patent application, the added injection part has a single function and cannot meet other complicated needs on the wiring harness.

Therefore, in the technical field of the wire harness, there is an urgent need of wire harness with a simple production process, high dimensional accuracy and long service life, and a molding method thereof, which can reduce the cost of the wire harness, increase the waterproofing grade, improve the production efficiency, reduce the product defective rate and extend the service life of the wire harness.

SUMMARY

In view of the above technical problems, in order to overcome the shortcomings of the prior art, the present disclosure provides a novel injection molded wire harness and a molding method, which can greatly reduce wire harness processing flow, reduce manual operation, improve product consistency, increase the waterproofing grade, and reduce product production cost. The present disclosure can realize one-time processing and forming of the complex wire harness, improve the production efficiency, and make the application of the wire harness more extensive. In the present disclosure, the wire harness with the sealing requirement can be molded in one time, so the sealing property of the wire harness is increased, the use of materials such as cement, sealant and the like is reduced, the service life of the waterproof area is prolonged, and the safety performance in use is improved greatly.

The object of the present disclosure is achieved by the following technical solution.

The present disclosure provides an injection molded wire harness including a terminal and at least one conductor, wherein one end of the terminal is connected to an electrical circuit of an electrical device, and the other end of the terminal is connected to the conductor; the wire harness is provided with a protective layer which is injection molded and wraps the conductor, and at least one positioning device that is injection molded for fixing the position of the wire harness and/or at least one sealing device that is injection molded for waterproofing. It should be noted that, the wire harness of the present disclosure is different from the conventional wire harness and can use a cable with an insulation layer or can directly use a conductor for injection molding. The conductor can be processed in a variety of ways, such as cutting of rolled conductors, cutting of copper foils, printing of conductors, 3D printing, and the like, which can be selected and optimized according to different wiring harness use environments, thereby saving raw materials to a greater extent, reducing processing time, and improving product quality.

In the injection molded wire harness of the present disclosure, the parts are connected together by being heated, melted, and then cooled and molded into an integrated structure, and there is no mutual wear between the parts, the relative positioning sizes between the parts are also accurate, the service life is greatly improved compared to the conventional wire harness, and the safety can be guaranteed.

Exemplary, an insulation layer is arranged outside the conductor, and the protective layer is injection molded outside the insulation layer.

Exemplary, the positioning device includes a first fixing device connected to the wire harness, and a fitting device matched and connected with a mounting end for installing the wire harness, with the fitting device being connected to the first fixing device.

It should be noted that when the wire harness is installed over a certain length, the positioning device is connected to the mounting end, to ensure that the wire harness can be fixed on the mounting end, such as an engine, a sheet metal bracket or other pipes. If there is no positioning device, the wire harnesses will move relative to each other on the mounting end, increasing the wear of the wire harnesses. In addition, the movement of the wire harness will also produce abnormal sound, affecting the using experience of cars, aircrafts, ships or various household appliances.

Exemplary, the first fixing device is a cylindrical structure, and an inner wall of the cylindrical structure is fitted with an outer surface of the protective layer and wraps the outer surface of the protective layer.

The cylindrical structure is for strengthening the strength of the fixing device and preventing the positioning device from falling off from the wire harness under stress.

Exemplary, the fitting device is a columnar structure having an inverted tooth structure on the outer periphery of the columnar structure.

When the columnar structure is matched with a mounting hole of the mounting end, the inverted tooth structure can prevent the columnar structure from falling off from the mounting hole.

Exemplary, the fitting device includes a clip-shaped structure.

Exemplary, the clip-shaped structure is provided with a groove in which barbs are arranged on both inner side walls. The barbs are arranged in the groove, so that when the clip-shaped structure matches with a sheet metal edge of the mounting end, the clip-shaped structure can catch the sheet metal edge and prevent the clip-shaped structure from falling off the sheet metal edge.

Exemplary, the fitting device includes a circular ring structure or a C-shaped ring structure. When the fitting device is matched with a pipe at the mounting end, the circular ring structure or the C-shaped ring structure can prevent the fitting device from falling off the pipe.

Exemplary, the positioning device is a plastic member processed by injection molding. Because the positioning device is in hard connection to the mounting end, if a rubber member is used, the deformation is large and the connection is not secure, thus a plastic member having good hardness and elasticity can be used.

Exemplary, the sealing device includes a second fixing device connected to the wire harness and a waterproof device, one end of which is connected to the second fixing device.

Exemplary, the second fixing device is a cylindrical structure, and an inner wall of the cylindrical structure is fitted with an outer surface of the protective layer and wraps the outer surface of the protective layer. The cylindrical structure is for strengthening the strength of the fixing device and preventing the sealing device from falling off from the wire harness under stress.

Exemplary, the sealing device is a rubber member processed by injection molding. Since the sealing device needs to seal the sealed end of the wire harness, an elastic material such as a rubber member or the like is used to seal the sealed end of the wire harness by injection molding, thereby preventing water from the outside environment from entering the interior of the wire harness, which may cause corrosion of the wiring harness conductors, a serious reduction in the service life of the wire harness, and a safety accident in severe cases.

It should be noted that the sealed end of the wire harness may refer to that when the general wire harness is installed, it will pass through via holes on a partition plate located between dry and wet areas. In order to prevent the water in the wet areas from entering into the dry areas, it is necessary to have a waterproof device on the wire harness to be in fitted and sealing connection to the via holes on the partition plate. In addition, when the wire harness is in a wet area, the conductor between the protective layer and the terminal of the wire harness may be exposed. A sealing device is required to seal and wrap the exposed conductor and terminal to prevent corrosion of the conductor and terminal by water in the external environment. In addition, when the sheath is in a wet area, in order to prevent water from entering into the sheath and causing corrosion of the terminal and the conductor, a sealing device is required to seal the hole of the sheath.

Exemplary, the wire harness is further provided with at least one sheath that is mutually inserted with an electrical device, and the terminal is fitted in a corresponding hole of the sheath.

Exemplary, the sheath is integrally injection molded onto at least the terminal.

The conductor is connected to the sheath through the terminal to which it is connected. In order to ensure a secure connection between the conductor and the sheath, the conductor and the sheath may be fixed together with the protective layer during injection molding of the protective layer, thereby prolonging the service life of the wire harness.

Exemplary, the conductor is a solid conductor, a flat conductor, or a conductor composed of multiple strands of wire. The conductor can be of different structures according to different use environments of the wire harness.

Exemplary, the terminal is connected to a solid conductor, a flat conductor, or a conductor composed of multiple strands of wire by crimping or welding.

In general, when the conductor and the terminal are the same material or similar materials, crimping is adopted. When the conductor and the terminal are of materials with large difference, welding is adopted.

Exemplary, a cross section of a conductive portion of the conductor is a circular, elliptical, polygonal, wavy, or profiled structure.

According to the structure of the conductor in the wire harness, the conductive portions with different cross sections can be selected to form a conducting circuit.

Exemplary, when the at least one conductor is more than two conductors belonging to the same circuit, the conductors on a non-terminal side are connected according to a requirement of the circuit by crimping or welding to form a conductor connection point.

Exemplary, the conductor connection point is wrapped and sealed by integral injection molding.

With the conductor connection points, the use amount of the conductor material can be greatly reduced, and the current is shunted by different conductors at proper positions. Due to the use of crimping or welding, conductor stress on both sides of the conductor connection point is concentrated. In the subsequent use, the stress may cause the conductor connection point to break and cause the wire harness to lose its function. Therefore, it is necessary to use the integral injection molding method to wrap and protect the conductor connection point. In the wet areas, the integral injection molding on the conductor connection point can also play the role of sealing and waterproof.

The present disclosure provides a method of preparing wire harness including:

A. preparing a semi-finished wire harness;

B. putting required raw materials into an injection molding equipment and drying them, then putting the semi-finished wire harness prepared in the step A into an injection mold; or putting the semi-finished wire harness prepared in the step A into an injection mold, and then putting required raw materials into an injection molding equipment and drying them;

C. starting the injection molding equipment to heat and melt the raw materials, and injecting the raw materials into the injection mold for molding.

Exemplary, in the case of a single conductor, preparing the semi-finished wire harness includes connecting the terminal to the conductor using a crimping or welding apparatus; the protective layer or the positioning device or the sealing device is injection molded in accordance with the step B to the step C.

Exemplary, in the case of more than one conductor, preparing the semi-finished wire harness includes connecting the terminal to the conductors using a crimping or welding apparatus; the protective layer is injection molded outside the conductors arranged at intervals in accordance with the step B to the step C, and the positioning device or the sealing device is injection molded in accordance with the step B to the step C.

Exemplary, in the case of more than two conductors belonging to the same circuit, preparing the semi-finished wire harness includes connecting the conductors according to the requirement of the circuit by crimping or welding to form a conductor connection point; a wire harness protection device is injection molded firstly in accordance with the step B to the step C, then the protective layer is injection molded and finally the positioning device or the sealing device is injection molded in accordance with the step B to the step C.

Exemplary, when the semi-finished wire harness is provided with a sheath, the terminal connected to the conductor is inserted into a corresponding hole of the sheath, and then an injection molding is performed; or the semi-finished wire harness is injection molded firstly, and then the terminal connected to the conductor is inserted into a corresponding hole of the sheath.

The semi-finished wire harness is put into the injection mold, and a sheath is integrally injection molded onto at least the terminal.

Compared with the prior art, the present disclosure has advantageous effects as follows.

1. In the conventional design method of the wire harness, various raw materials such as a cable, a terminal, a sheath, a fixing device, a waterproof device, an adhesive tape, a supporting line groove and the like are purchased and processed separately, then assembled into a finished wire harness. This method can make a raw material manufacturer and a wire harness factory work together and do their jobs, each perform their own duties. However, the process flow is particularly complex, with many processing procedures and high defective rate in the production process, so it is difficult to ensure the size and performance of the finished wire harness. The inventor of the present application has discovered that, except for the conductor and terminal, other parts of the wire harness are basically plastic members and rubber members. At present, the plastic members and the rubber members are mostly produced by injection molding, thus the injection molding method of the present disclosure is used to prepare the wire harness protective layer, the positioning device and the waterproof device, which can reduce the cost of the wire harness, improve the production efficiency, reduce the product defective rate, and prolong the service life of the wire harness.

2. In the present disclosure, the wire harness is directly injection molded using conductors. The conductors can be processed in a variety of ways, which can be selected and optimized according to different wiring harness use environments, thereby saving raw materials of the wire harness to a greater extent, reducing processing hours, and improving product quality. This also provides a wider range of design options for wire harness designers to reduce wire harness costs and improve product stability of the wire harness. The injection molded protective layer of the present disclosure replaces the manual operation of the sleeve and the covering adhesive tape in the conventional wire harness, and can realize automatic production, and the more branches of the wire harness, the more working hours can be saved. In addition, the protective layer made by the injection molding method avoids the defects of inaccurate size of operation of manually covering the adhesive tape and insufficient protection of the connection, and can better ensure the quality of the wire harness and prolong the service life of the wire harness.

3. In the disclosure, the wire harness is processed by integral injection molding, so the protective layer, the positioning device and the sealing device and other components of the wire harness can be tightly combined, so that the waterproof effect of the wire harness can reach IP67 level. After the wire harness has been subjected to salt spray test, high and low temperature test, vibration test, and aging test, the mechanical and electrical properties between the conductor and the terminal of the wire harness are minimally affected, which can better ensure the quality of the wire harness and prolong the service life of the wire harness. Meanwhile, the injection molding materials are more varied, and different injection molding materials can be selected according to different application environments, so that the wire harness is more flexible, has better anti-vibration effect, and can be used in harsh vibration environment, thus significantly prolonging the service life of the wire harness and improving the safety of the wire harness.

4. In the wire harness of the present disclosure, a wire with an insulation layer may also be used. When the wire harness circuit is less, or the length of the wire is long and the sealing requirement is not high, the use of the wire with an insulation layer can reduce the cost of the injection mold.

5. The injection molding method of the present disclosure is used to process the positioning device instead of fixing with an adhesive tape and fixing with a tie tape, the position size of the positioning device is ensured by the mold to be accurate and consistent, which can better guarantee the quality of the wire harness products. Meanwhile, since the positioning device is integrally molded on the wire harness, the combination is stronger, the positioning device is not easy to fall off, and the positioning effect is better, and in relatively harsh vibration environment, the positioning device rarely has dimensional deviation and detachment from the wire harness that may cause the failure of the positioning function of the wire harness, thereby significantly prolonging the service life of the wire harness. The fitting device is processed by injection molding, and can be set into different styles according to different shapes of the mounting end of the wire harness, so that the wire harness is installed more conveniently and the installation efficiency of the wire harness is remarkably improved. The positioning device may be a plastic member which can be injection molded more conveniently. When the plastic member is fitted with the mounting end of the wire harness, the elasticity of the plastic member allows better fitting, which significantly improves the installation efficiency of the positioning device, and greatly prolongs the service life of the wire harness due to high corrosion resistance of the plastic member.

6. The injection molding method of the present disclosure is used to process the sealing device. In the use environment of the wiring harness, the wet area and the dry area are sealed with the sealing device, which prevents water from the wet areas from entering the dry area, or entering the electrical circuit, damaging the electrical lines in the dry areas, resulting in failure of the electrical function and, in severe cases, a safety accident. The injection molding of the disclosure is used to integrally inject the sealing device, so there is no need to pre-stretch the sealing device and then the wire harness penetrates through the sealing device just as in normal wire harness processing. This ensures that the position and size of the sealing device are accurate, and that the sealing device and the protective layer can be combined more tightly without the use of cement or sealant, thus saving material costs and installation time. Because of one-time shaping by the injection molding method, the sealing device is not easy to be damaged, and is more tightly combined with the wire harness protective layer, and even in relatively harsh vibration environment, the sealing device will not have dimensional deviation and detachment from the wire harness that may cause the failure of the positioning function of the wire harness, thereby significantly prolonging the service life of the wire harness. Meanwhile, the sealing device may also be disposed between the terminal and the conductor, between the sheath and the protective layer, so as to seal the conductor better, prevent the corrosion of the conductor by water in the external environment, and significantly prolong the service life of the wire harness. The sealing device may be a rubber member which is better attached to other parts, and meanwhile the elasticity of the rubber member can improve the sealing performance of the wire harness, thereby obviously improving the service life of the wire harness.

7. In the wire harness of the present disclosure, a separate sheath or an integrally molded sheath is used, which can be matched and installed with the electrical device more quickly, so as to improve the installation efficiency, and quickly replace the damaged wire harness, improve the repair efficiency of the wire harness, and reduce the labor cost. The integrally molded sheath is processed faster and is more tightly combined with the terminal, the protective layer, or the insulation layer, thereby significantly improving the sealing grade of the wire harness.

8. The conductor may be a solid conductor, a flat conductor, or a conductor composed of multiple strands of wire, and may has a conductive portion with various cross section. The conductor structures can be adopted according to the actual use environment of the wire harness, so as to save the cost of the wire harness, and improve the installation efficiency of the wire harness. Meanwhile, different conductor structures and different cross section of the conductive portions of the conductors can adapt to the terminals of different connection modes, which is convenient for the wire harness designer to select the terminal and the conductor used in the wire harness, and further optimize the cost of the wire harness, and improve the product stability of wire harness.

9. In the wire harness of the present disclosure, when more than two conductors belong to the same circuit, the conductors on the non-terminal side are connected as a conductor connection point according to the requirement of the circuit by crimping or welding, so that in the designing of the wire harness, the use amount of the conductor can be reduced, and the cost of the wire harness can be significantly reduced. Meanwhile, the conductor connection points are wrapped and sealed by integral injection molding, so as to ensure that the conductor connection point will not be damaged during installation and use of the wiring harness, and even in a harsh vibration environment, the conductor connection point that are wrapped and sealed by integral injection molding is not broken by vibration, and which can prevent the corrosion of the conductor connection point by water in the external environment, and significantly prolong the service life of the wire harness.

10. The present disclosure further provides a method of preparing an integrally injection molded wire harness, in which different process flows can be adopted according to different wire harness structures, so as to significantly improve the production efficiency of the wire harness, and reduce the cost of wire harness.

The above description is merely an overview of the technical solution of the present disclosure. In order to better understand the technical features of the present disclosure and implement the technical features according to the specification, and in order to make the above and other objects, features, and advantages of the present disclosure be easier to understand, detailed description will be given below by combining exemplary embodiments in conjunction with the accompanying drawings.

BRIEF DESCRIPTION OF THE DRAWINGS

FIG. 1 is a schematic view of a wire harness with a single conductor, without sheath, and with a positioning device and a sealing device according to the present disclosure.

FIG. 2 is a schematic view of a wire harness with multiple conductors, with a sheath, and with a positioning device and a sealing device according to the present disclosure.

FIG. 3A is a cross-sectional schematic view of a wire harness with a single conductor and a protective layer according to the present disclosure.

FIG. 3B is a cross-sectional schematic view of a wire harness with multiple conductors arranged in a linear direction, and with a protective layer according to the present disclosure.

FIG. 3C is a cross-sectional schematic view of a wire harness with multiple conductors arranged in a circumferential direction, and with a protective layer according to the present disclosure.

Figure 3D:
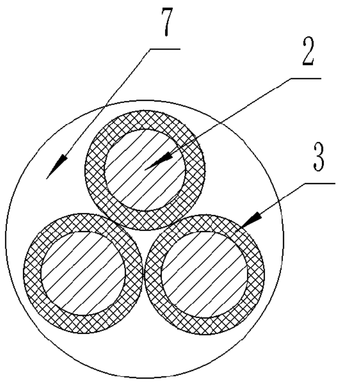
FIG. 3D is a cross-sectional schematic view of a wire harness with multiple conductors, insulation layers, and a protective layer according to the present disclosure.

In the drawings, the reference numerals are: 1. terminal; 2. conductor; 3. insulation layer; 4. sealing device; 5. positioning device; 6. sheath; 7. protective layer; 8. wire harness protection device; 9. waterproof device; 10. second fixing device; 11. fitting device; 12. first fixing device; 13. waterproof jacket; 14. locking groove.

DETAILED DESCRIPTION

In order to further illustrate the technical features and effects of the present disclosure for achieving the intended object of the present disclosure, hereinafter specific embodiments, structures, features and functions thereof according to the present disclosure will now be described in detail in conjunction with the drawings and exemplary embodiments as follows.

The First Embodiment

As shown in FIGS. 1 and 3A, the wire harness includes a single conductor 2, and both ends of the conductor 2 are respectively connected to a terminal 1. The terminal 1 is a copper terminal, which is made of a copper alloy with a copper content of 60%, thereby ensuring good electrical conductivity and workability of the copper terminal. The surface of the terminal 1 can be plated with one selected from the group of nickel, cadmium, zirconium, chromium, cobalt, manganese, aluminum, tin, titanium, zinc, copper, silver, and gold. The plating can slow down the corrosion of the terminal and prolong the service life of the terminal. One end of the terminal 1 is connected to the conductor 2, and the other end of the terminal 1 is connected to an electrical circuit of an electrical device when in use. In this embodiment, the conductor 2 is composed of multiple core wires, and the cross section of the multiple core wires is circular. In other embodiments, the conductor 2 may also be a solid conductor or a flat conductor. The cross section of the conductive portion of the conductor 2 may also be elliptical, polygonal, wavy, or profiled. The wire harness is provided with a protective layer 7 which is injection molded and wraps the conductor 2. The protective layer 7 is made of plastic or rubber. In this embodiment, the material of the protective layer 7 is PVC. The wire harness is also provided with at least one positioning device 5 that is injection molded for fixing the position of the wire harness and/or at least one sealing device 4 that is injection molded for waterproofing.

The conductor 2 may be an externally purchased electric wire with an insulation layer 3, and the protective layer 7 is injection molded outside the insulation layer 3. Alternatively, the protective layer 7 may be directly injection molded outside the conductor 2. As shown in FIG. 3A, the single conductor 2 is arranged in the middle, and the protective layer 7 is injection molded on the periphery of the single conductor 2.

After the conductor 2 is cut by a predetermined length, both ends of the conductor 2 are connected to the terminal 1 by crimping or welding to obtain a semi-finished product. The semi-finished product is then put into an injection mold, and the protective layer 7, the positioning device 5 and the sealing device 4 are formed by injection molding according to predetermined dimensions. The specific injection molding method is as follows:

A. preparing a semi-finished wire harness;

B. putting the required raw materials into an injection molding equipment and drying them, then putting the semi-finished wire harness prepared in the step A into an injection mold; or putting the semi-finished wire harness prepared in the step A into an injection mold, and then putting the required raw materials into an injection molding equipment and drying them;

C. starting the injection molding equipment to heat and melt the raw materials, and injecting the raw materials into the injection mold for molding.

Figure 5:
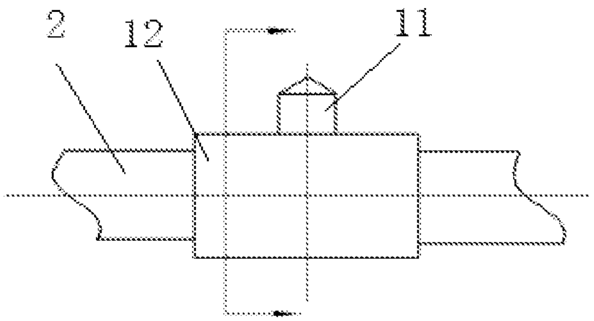
FIG. 5 is a structural schematic diagram of a positioning device according to the present disclosure.
Figure 6:
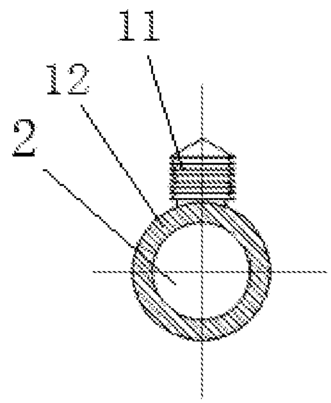
FIG. 6 is a schematic view of a fitting device with an inverted tooth structure.
Figure 7:
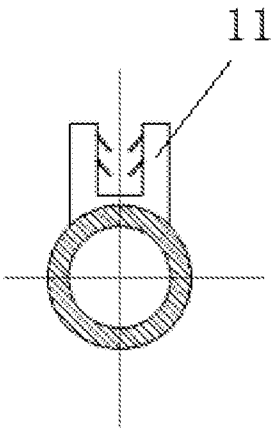
FIG. 7 is a schematic view of a fitting device with a clip-shaped structure.
Figure 8:
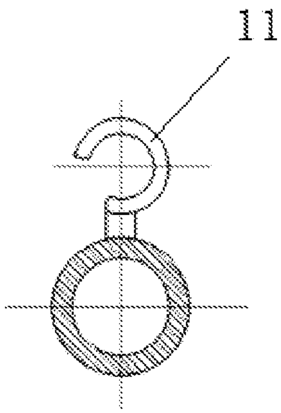
FIG. 8 is a schematic view of a fitting device with a C-shaped ring structure.

The material of the positioning device 5 is PA66, and in other embodiments, the positioning device 5 may be a plastic member processed by injection molding. As shown in FIG. 5, the positioning device 5 includes a first fixing device 12 connected to the wire harness and a fitting device 11 matched and connected with a mounting end for installing the wire harness. The fitting device 11 is connected to the first fixing device 12. The first fixing device 12 is a cylindrical structure, and an inner wall of the cylindrical structure is fitted with an outer surface of the protective layer 7 and wraps the outer surface of the protective layer 7. The specific structure of the fitting device 11 may include an inverted tooth structure which is mutually inserted with a mounting hole for installing the wire harness. Specifically, the fitting device is a columnar structure, and the outer periphery of the columnar structure is provided with an inverted tooth structure which is mutually inserted and snapped with the mounting hole (as shown in FIG. 6). In other embodiments, the fitting device may also be provided with a clip-shaped structure (as shown in FIG. 7) for matching and connecting with a plate. Specifically, the fitting device 11 is provided with a groove, on the two inner side walls of which barbs for latching with the plate are provided. Alternatively, the fitting device 11 is provided with a circular ring structure or a C-shaped ring structure for matching with a tubular or cylindrical structure (as shown in FIG. 8).

Figure 9A:
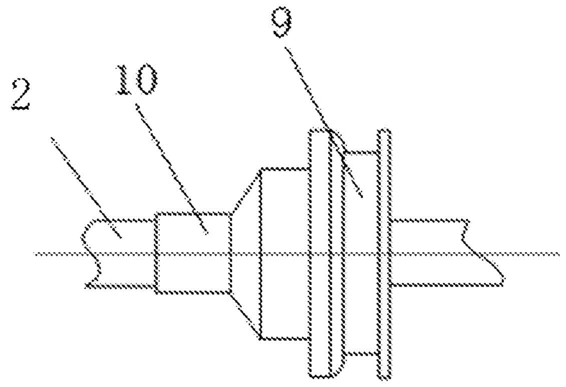
FIG. 9A is a structural schematic diagram of a wire harness with a sealing device matched with a via hole on a partition plate according to the present disclosure.
Figure 9B:
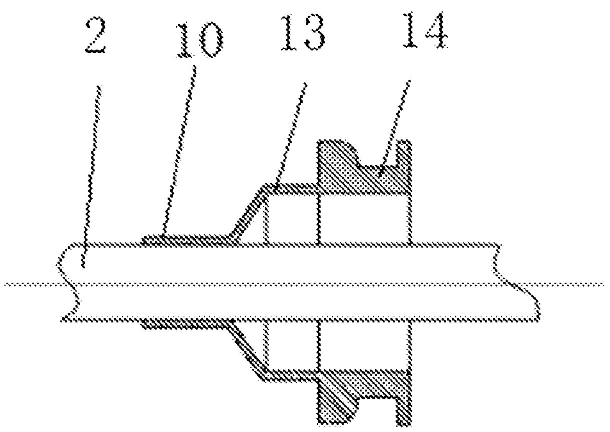
FIG. 9B is a partial sectional structural schematic diagram of FIG. 9A.

It should be noted that, the material of the sealing device 4 is EPDM, and in other embodiments, the sealing device 4 may be a rubber member processed by injection molding. Generally, when installed, the wire harness needs to pass through some via holes on a partition plate located between dry and wet areas. In order to prevent the water in the wet areas from entering into the dry areas, as shown in FIGS. 9A and 9B, the sealing device 4 in this embodiment includes a second fixing device 10 connected to the wire harness and a waterproof device 9, and the waterproof device 9 is connected to the second fixing device 10. The second fixing device 10 is a cylindrical structure, and an inner wall of the cylindrical structure is fitted with an outer surface of the protective layer 7 and wraps on the outer surface of the protective layer 7. The waterproof device 9 includes a waterproof jacket 13 having one end connected to the second fixing device 10, and a locking groove 14 connected to the other end of the waterproof jacket 13 and used for fitting with a waterproof hole.

Figure 10:
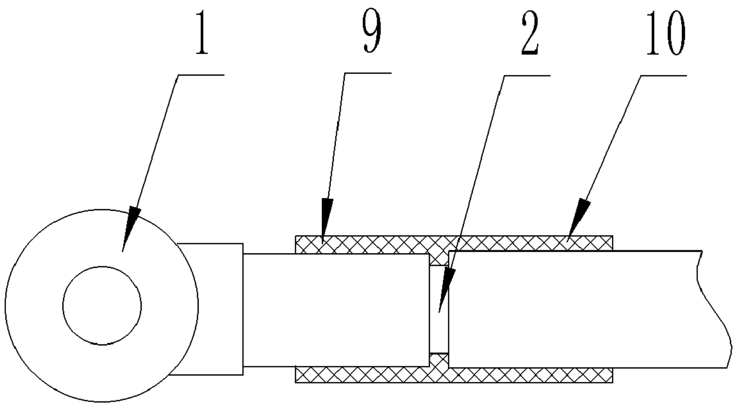
FIG. 10 is a structural schematic diagram of a sealing device for a conductor, a terminal and a protective layer according to the present disclosure.

In this embodiment, when the wire harness is in a wet area, the sealing device is provided between the protective layer 7, the conductor 2 and the terminal 1 of the wire harness, to seal and wrap the protective layer 7, the conductor 2 and the terminal 1. As shown in FIG. 10, the sealing device 4 is injection molded on the conductor 2, a connection position between the terminal 1 and the conductor 2, and the outside of the protective layer. The portion of the sealing device 4 corresponding to the conductor 2 and the terminal 1 is the waterproof device 9, and the portion of sealing device 4 corresponding to the protective layer 7 is the second fixing device 10.

The Second Embodiment

As shown in FIGS. 2, 3B and 3C, the wire harness includes more than one conductor 2, and both ends of each of the conductors 2 are respectively connected to a terminal 1. The surface of the terminal 1 can be plated with one selected from the group of nickel, cadmium, zirconium, chromium, cobalt, manganese, aluminum, tin, titanium, zinc, copper, silver, and gold. The conductor 2 and the terminal 1 in this embodiment are the same as those in the First Embodiment, so will not be described in detail. The difference between this embodiment and the First Embodiment is that the wire harness is further provided with at least one sheath 6 for mutually inserting with an electrical device. After the conductor 2 is connected to the terminal 1, the terminal 1 is fitted in the sheath 6, and different terminals 1 correspond to different holes of the sheath 6 according to design requirements, so as to connect different circuits, and also protect the terminal 1 from damage. The sheath 6 is integrally injection molded onto at least the terminal 1.

After the multiple conductors 2 are cut respectively by a predetermined length, both ends of each conductor 2 are connected to the terminal 1 by crimping or welding to obtain a semi-finished product. The semi-finished product is then put into an injection mold, and the protective layer 7, the positioning device 5 and the sealing device 4 are formed by injection molding according to predetermined dimensions. Specifically, the wire harness protection device 8 is injection molded firstly, then the wire harness protective layer 7 is injection molded and finally the positioning device 5 or the sealing device 4 is injection molded.

In this embodiment, when the wire harness is in a wet area, the sealing device 4 is provided between the protective layer 7, the conductor 2 and the terminal 1 of the wire harness, to seal and wrap the protective layer 7, the conductor 2 and the terminal 1. As shown in FIG. 10, the sealing device 4 is injection molded on the conductor 2, a connection position between the terminal 1 and the conductor, and the outside of the protective layer 7. The portion of the sealing device 4 corresponding to the conductor 2 and the terminal 1 is the waterproof device 9, and the portion of the sealing device 4 corresponding to the protective layer 7 is the second fixing device 10.

The specific injection molding method is as follows:

A. preparing a semi-finished wire harness;

B. putting the required raw materials into an injection molding equipment and drying them, then putting the semi-finished wire harness prepared in the step A into an injection mold; or putting the semi-finished wire harness prepared in the step A into an injection mold, and then putting the required raw materials into an injection molding equipment and drying them;

C. starting the injection molding equipment to heat and melt the raw materials, and injecting the raw materials into the injection mold for molding.

The parameters of injection molding include heating temperature, cooling temperature, injection molding pressure, and injection molding time. The injection molding operation is performed according to the conventional operation method of the existing injection molding equipment. Requirements are that the injection-molded products shall be free of defects such as impurities, pits, flash, pores, and etc.

As shown in FIGS. 3B and 3C, the multiple conductors 2 are arranged in the middle, and the protective layer 7 is molded around the periphery of the multiple conductors 2. Therefore, in one aspect, the multiple conductors 2 are bound together by the protective layer 7 to prevent the conductors 2 from scattering during the wire harness installation, and in the other aspect, the multiple conductors 2 are insulated and isolated by the protective layer 7 to prevent the multiple conductors 2 from being short-circuited to each other and from being damaged by an external force such as scraping after the wire harness is installed. In this embodiment, the conductor 2 is a solid conductor or a flat conductor, and the cross section of the conductive portion of the conductor 2 is a profiled structure, oval structure, or wavy structure. The protective layer 7 is made of PVC. The positioning device 5 and the sealing device 4 are the same as those of the First Embodiment, and are not described in detail herein.

The Third Embodiment

Figure 4:
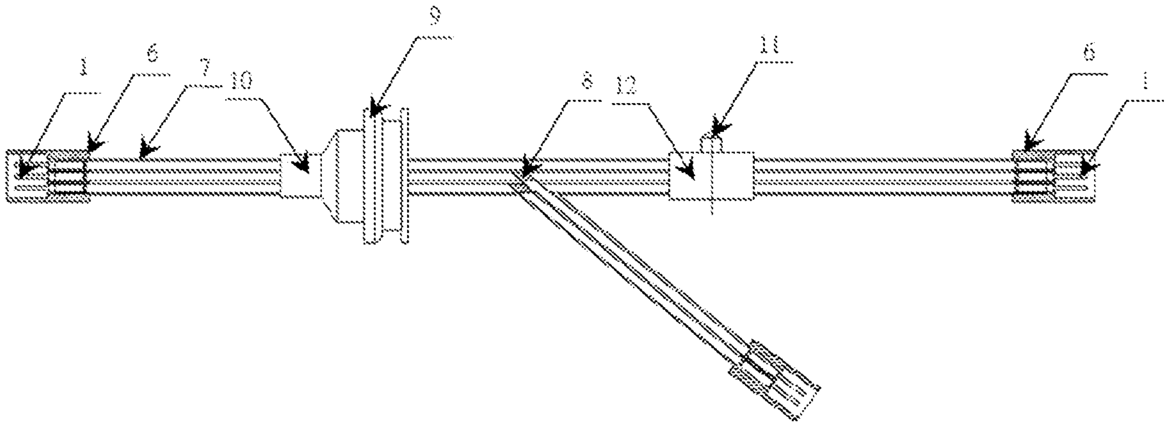
FIG. 4 is a schematic view of a wire harness with multiple conductors and conductor connection points according to the present disclosure.

As shown in FIG. 4, the wire harness includes more than one conductor 2. The ends of some conductors 2 are connected to a terminal 1, and the ends of the other conductors 2 are connected according to a circuit requirement by crimping or welding to form a conductor connection point. The surface of the terminal 1 is plated with one selected from the group of silver, nickel, cadmium, zirconium, chromium, cobalt, manganese, aluminum, tin, titanium, zinc, and gold. After the conductors 2 is connected to the terminal 1, the terminal 1 is fitted in a sheath 6 for mutually inserting with an electrical device, and different terminals 1 correspond to different holes of the sheath 6 according to design requirements. At the time of preparation, the conductor connection point is entirely sealed by a wire harness protection device 8, which is a rubber member or a plastic member processed by injection molding. As shown in FIG. 3D, an insulation layer 3 is disposed outside the conductors 2, and a protective layer 7 is injection molded outside the insulation layer 3. The terminal 1 and the sheath 6 in this embodiment are the same as those in the First Embodiment, and are not described in detail herein.

After the multiple conductors 2 are cut respectively by a predetermined length, according to a design requirement, some conductors 2 are connected to the terminals 1 by crimping or welding, respectively. When the other conductors 2 are two or more conductors and belong to the same circuit, the conductors on a non-terminal side are connected to form a conductor connection point by crimping or welding according to the requirement of the circuit, so as to obtain a semi-finished product. The semi-finished product is then put into an injection mold, and according to the predetermined dimensions, the wire harness protection device 8 is injection molded firstly, then the protective layer 7 is injection molded, and finally the positioning device 5 and/or the sealing device 4 is injection molded according to the injection molding steps described in the Second Embodiment. In this embodiment, the conductor 2 includes multiple strands of wire, and the cross section of the conductive portion of the conductor 2 is a polygonal structure. The material of the wire harness protection device 8 is plastic, and in other applications, the material of the wire harness protection device 8 may be rubber. The protective layer 7, the positioning device 5, and the sealing device 4 in this embodiment are the same as those of the Second Embodiment, and are not described in detail herein.

In the method of preparing the wire harness by injection molding, when the semi-finished wire harness is provided with a sheath 6, the terminal 1 connected to the conductor 2 is inserted into the corresponding hole of the sheath 6, and then injection molding is performed; or the semi-finished wire harness is injection molded firstly, and then the terminal 1 connected to the conductor 2 is inserted into the corresponding hole of the sheath 6.

Figure 11:
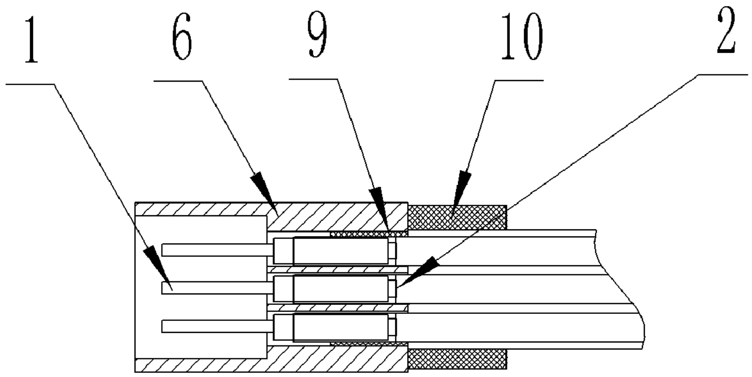
FIG. 11 is a structural schematic diagram of a sealing device for a sheath according to the present disclosure.

As shown in FIG. 11, when the sheath 6 is in wet areas, in order to prevent water from entering into the sheath 6, the sealing device 4 is provided to seal the holes of the sheath 6, and a waterproof device 9 is injection molded in the gaps between the sheath 6 and the conductors 2 to seal the sheath 6 for waterproof, and a second fixing device 10 is connected at the ends of the waterproof device 9 and the sheath 6. The waterproof device 9 is formed by injection molding, and the second fixing device 10 is a sleeve structure for matching with the protective layer 7 outside the conductors 2.

Figure 12:
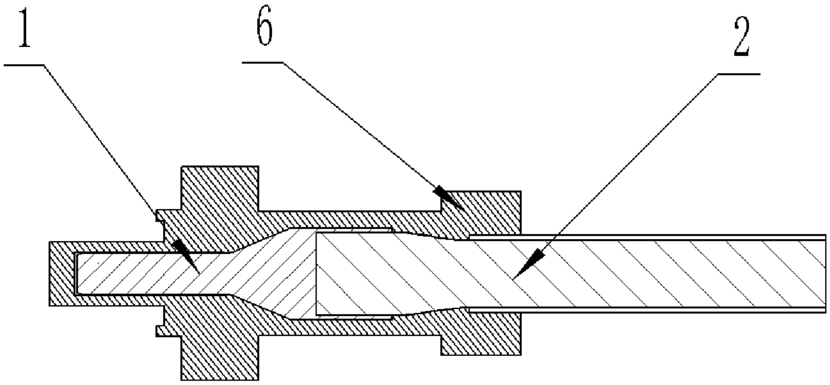
FIG. 12 is a structural schematic diagram of an integrally molded sheath according to the present disclosure.

As shown in FIG. 12, the sheath 6 described in this embodiment may also be integrally injection molded. The semi-finished wire harness is put into an injection mold, and the sheath 6 is integrally injection molded onto at least the terminal 1. In other embodiments, the sheath 6 may also be integrally injection molded onto the terminal 1 and the conductor 2, or the sheath 6 may be integrally injection molded onto the terminal 1, the conductor 2 and the protective layer 7.

In order to demonstrate the influences of the wire harness processed by the conventional method and the integrally injection molded wire harness according to the First, Second, and Third Embodiments of the present disclosure on the mechanical properties and electrical properties of the terminal and conductor of the wire harness, the inventor of the present application has conducted a series of experiments on mechanical properties, electrical properties and service life of the two kinds of wire harnesses processed by the above two different methods.

The specific experimental process is as follows: the actual use environment of the harness is simulated, but the test conditions are increased to a level much stricter than those of the actual use environment, so as to obtain the test results in a short time, which can be achieved for a long time under the actual use environment. The series of experiments include: 1) testing the initial pullout force and voltage drop of the terminal 1 and the conductor 2 of the two kinds of wire harnesses obtained by the above two different methods to obtain the initial mechanical and electrical properties of the wire harnesses; 2) carrying out a salt spray experiment for 1000 hours, by spraying salt water onto the two kinds of wire harnesses using a salt spray experimental box, which can replace the salt spray resistance test for ten years in the actual coastal environment; 3) carrying out a high and low temperature experiment for 200 hours, by putting the two kinds of wire harnesses under the highest and lowest temperatures of the use environment for one hour respectively, with a temperature switching time of less than 5 seconds, and the temperature switching is performed for 100 cycles, which can replace the high and low temperature resistance test for 10 years in the external cold-hot alternate environment; 4) carrying out a vibration test for 120 hours, by fixing the two kinds of wire harnesses on a vibration experiment table, selecting a vibration amplitude according to the use environment, and vibrating the two kinds of wire harnesses in three directions, which can replace the vibration test for 10 years in the actual vibration environment; 5) carrying out an aging test for 6,000 hours, by putting the two kinds of wire harnesses into an aging experiment box to simulate an environment exceeding the rated use conditions, which can replace the aging test for 20 years in the actual use environment. The voltage drop value and the pullout force value of the terminal 1 and the conductor 2 of the two kinds of wire harnesses are tested after each experiment. The experimental results are shown in Tables 1-1, 1-2 and 1-3.

TABLE 1-1

Influence of the conventional wire harness and the integrally injection molded wire harness on the pullout force and the voltage drop of the terminal and the conductor (before experiment and after the salt spray test for 1000 hours)

| | Type of wire harness | | | | | | | |
|---|---|---|---|---|---|---|---|---|
| | Conventional wire harness | | Integrally injection molded wire harness | | Conventional wire harness | | Integrally injection molded wire harness | |
| | State | | | | | | | |
| | After the processing is completed | | | | After 1,000 hours of salt spray experiment | | | |
| Test | Pullout force (N) | Voltage drop (mV) | Pullout force (N) | Voltage drop (mV) | Pullout force (N) | Voltage drop (mV) | Pullout force (N) | Voltage drop (mV) |
| 1 | 2343 | 0.35 | 2456 | 0.34 | 2057 | 0.42 | 2388 | 0.37 |
| 2 | 2567 | 0.37 | 2547 | 0.35 | 2136 | 0.46 | 2436 | 0.37 |
| 3 | 2476 | 0.37 | 2458 | 0.36 | 2085 | 0.45 | 2384 | 0.38 |
| 4 | 2541 | 0.38 | 2572 | 0.35 | 2064 | 0.45 | 2492 | 0.36 |
| 5 | 2347 | 0.37 | 2438 | 0.36 | 2088 | 0.43 | 2397 | 0.38 |
| 6 | 2463 | 0.39 | 2589 | 0.35 | 2126 | 0.46 | 2416 | 0.37 |
| 7 | 2389 | 0.37 | 2548 | 0.34 | 2063 | 0.45 | 2404 | 0.36 |
| 8 | 2554 | 0.34 | 2490 | 0.33 | 2081 | 0.43 | 2426 | 0.35 |

TABLE 1-1-continued

Influence of the conventional wire harness and the integrally injection molded wire harness on the pullout force and the voltage drop of the terminal and the conductor (before experiment and after the salt spray test for 1000 hours)

| | Type of wire harness | | | | | | | |
|---|---|---|---|---|---|---|---|---|
| | Conventional wire harness | | Integrally injection molded wire harness | | Conventional wire harness | | Integrally injection molded wire harness | |
| | State | | | | | | | |
| | After the processing is completed | | | | After 1,000 hours of salt spray experiment | | | |
| Test | Pullout force (N) | Voltage drop (mV) | Pullout force (N) | Voltage drop (mV) | Pullout force (N) | Voltage drop (mV) | Pullout force (N) | Voltage drop (mV) |
| 9 | 2487 | 0.38 | 2561 | 0.32 | 2066 | 0.45 | 2484 | 0.38 |
| 10 | 2454 | 0.36 | 2548 | 0.33 | 2083 | 0.46 | 2438 | 0.35 |
| Average value | 2462.1 | 0.368 | 2520.7 | 0.343 | 2084.9 | 0.446 | 2426.5 | 0.367 |

TABLE 1-2

Influence of the conventional wire harness and the integrally injection molded wire harness on the pullout force and the voltage drop of the terminal and the conductor (200 hours of high and low temperature experiment and 120 hours of vibration experiment)

| | Type of wire harness | | | | | | | |
|---|---|---|---|---|---|---|---|---|
| | Conventional wire harness | | Integrally injection molded wire harness | | Conventional wire harness | | Integrally injection molded wire harness | |
| | State | | | | | | | |
| | After 200 hours of high and low temp, experiment | | | | After 20 hours of vibration experiment | | | |
| Test | Pullout force (N) | Voltage drop (mV) | Pullout force (N) | Voltage drop (mV) | Pullout force (N) | Voltage drop (mV) | Pullout force (N) | Voltage drop (mV) |
| 1 | 2046 | 0.43 | 2373 | 0.38 | 2072 | 0.42 | 2385 | 0.36 |
| 2 | 2074 | 0.45 | 2426 | 0.37 | 2045 | 0.43 | 2433 | 0.36 |
| 3 | 2125 | 0.44 | 2387 | 0.36 | 2131 | 0.45 | 2369 | 0.37 |
| 4 | 2052 | 0.46 | 2448 | 0.37 | 2077 | 0.44 | 2435 | 0.37 |
| 5 | 2077 | 0.43 | 2372 | 0.38 | 2094 | 0.45 | 2364 | 0.38 |
| 6 | 2054 | 0.45 | 2435 | 0.37 | 2048 | 0.44 | 2466 | 0.37 |
| 7 | 2098 | 0.46 | 2416 | 0.36 | 2093 | 0.44 | 2425 | 0.38 |
| 8 | 2125 | 0.45 | 2462 | 0.39 | 2084 | 0.46 | 2432 | 0.36 |
| 9 | 2058 | 0.43 | 2469 | 0.37 | 2038 | 0.44 | 2479 | 0.36 |
| 10 | 2064 | 0.44 | 2415 | 0.37 | 2047 | 0.47 | 2447 | 0.38 |
| Average value | 2077.3 | 0.444 | 2420.3 | 0.372 | 2072.9 | 0.444 | 2423.5 | 0.369 |

TABLE 1-3

Influence of the conventional wire harness and the integrally injection molded wire harness on the pullout force and the voltage drop of the terminal and the conductor (600 hours of aging experiment)

| | Type of wire harness | | | |
|---|---|---|---|---|
| | Conventional wire harness | | Integrally injection molded wire harness | |
| | State | | | |
| | After 600 hours of aging experiment | | | |
| Test | Pullout force (N) | Voltage drop (mV) | Pullout force (N) | Voltage drop (mV) |
| 1 | 2064 | 0.48 | 2345 | 0.38 |
| 2 | 2037 | 0.47 | 2443 | 0.37 |

TABLE 1-3-continued

Influence of the conventional wire harness and the integrally injection molded wire harness on the pullout force and the voltage drop of the terminal and the conductor (600 hours of aging experiment)

| | Type of wire harness | | | |
|---|---|---|---|---|
| | Conventional wire harness | | Integrally injection molded wire harness | |
| | State | | | |
| | After 600 hours of aging experiment | | | |
| Test | Pullout force (N) | Voltage drop (mV) | Pullout force (N) | Voltage drop (mV) |
| 3 | 2024 | 0.47 | 2354 | 0.37 |
| 4 | 2034 | 0.48 | 2447 | 0.36 |

TABLE 1-3-continued

Influence of the conventional wire harness and the integrally injection molded wire harness on the pullout force and the voltage drop of the terminal and the conductor (600 hours of aging experiment)

| | Type of wire harness: Conventional wire harness | | Integrally injection molded wire harness | |
|---|---|---|---|---|
| | State: After 600 hours of aging experiment | | | |
| Test | Pullout force (N) | Voltage drop (mV) | Pullout force (N) | Voltage drop (mV) |
| 5 | 2072 | 0.46 | 2358 | 0.38 |
| 6 | 2047 | 0.48 | 2349 | 0.37 |
| 7 | 2052 | 0.47 | 2432 | 0.37 |
| 8 | 2034 | 0.47 | 2438 | 0.36 |
| 9 | 2036 | 0.48 | 2475 | 0.38 |
| 10 | 2049 | 0.47 | 2449 | 0.36 |
| Average value | 2044.9 | 0.473 | 2409 | 0.37 |

As can be seen from the results of the above Tables 1-1, 1-2 and 1-3, the values of the initial pullout force values and the voltage drop values of the terminal 1 and the conductor 2 of the wire harness processed by the conventional method, are close to those of the wire harness processed by the integrally injection molded method.

After being subjected to 1,000 hours of salt spray experiment, 200 hours of high and low temperature experiment, 120 hours of vibration experiment, and 6,000 hours aging experiment, respectively, the pullout force values of the terminal 1 and the conductor 2 of the integrally injection molded wire harness are much higher than those of the terminal 1 and the conductor 2 of the wire harness processed by the conventional method, and are also close to the initial pullout force values.

However, in the wire harness processed by the conventional method, the pullout force of the terminal 1 and the conductor 2 after the experiments is obviously reduced, the mechanical property is unstable, the terminal 1 and the conductor 2 of the wire harness may be disconnected, resulting in a short circuit of the wire harness, which may lead to functional failure in a gentle case and a burning accident in a serious case.

The voltage drop of the terminal 1 and the conductor 2 of the integrally injection molded wire harness after the experiments is basically the same as the initial voltage drop of the terminal 1 and the conductor 2 of the wire harness processed by the conventional method.

However, in the wire harness processed by the conventional method, the voltage drop of the terminal 1 and the conductor 2 is obviously reduced, the electrical performance is unstable, and the contact resistance between the terminal 1 and the conductor 2 is increased, which causes the terminal 1 and the conductor 2 of the wire harness to generate heat and turn red when in electric conduction, and in severe cases, the terminal 1 and the conductor 2 will burn due to excessive temperature, resulting in serious accidents.

Therefore, the mechanical and electrical properties of the integrally injection molded wire harness after the experiments are much better than those of the wire harness processed by the conventional method, thereby reducing the defective rate of the product and prolonging the service life of the wire harness.

In order to demonstrate the positioning effect of the fixing devices of the wire harnesses processed by the conventional method and by the integrally injection molded method according to the First, Second, and Third Embodiments of the present disclosure under a vibration environment, 100 of the two kinds of wire harnesses are selected respectively, and a vibration test is performed on the fixing devices of the two kinds of wire harnesses. The results are shown in the table below.

TABLE 2

Influence of the conventional wire harness and the integrally injection molded wire harness on performance of the fixing device through a vibration test (120 hours of vibration experiment)

| Conventional wire harness | | | | Integrally injection molded wire harness | | | | | |
|---|---|---|---|---|---|---|---|---|---|
| fixing with a tie tape | | fixing with an adhesive tape | | columnar structure | | clip-shaped structure | | circular ring structure or C-shaped ring structure | |
| positioning size deviation | wire harness discon-nection | positioning size deviation | wire harness discon-nection | positioning size deviation | wire harness discon-nection | positioning size deviation | wire harness discon-nection | positioning size deviation | wire harness discon-nection |
| 52% | 11% | 69% | 24% | 0% | 0% | 1% | 0% | 1% | 0% |

As can be seen from the above Table, in the conventional wire harness with the positioning device being fixed by a tie tape, the number of the wire harnesses with positioning size deviation of the positioning device 5 accounts for 52% of the total number of the wire harnesses, and the number of the wire harnesses disconnected accounts for 11% of the total number of the wire harnesses, with a very high defective rate. In the conventional wire harness with the positioning device 5 being fixed by an adhesive tape, the number of the wire harnesses with positioning size deviation of the positioning device 5 accounts for 69% of the total number of the wire harnesses, and the number of the wire harnesses disconnected accounts for 24% of the total number of the wire harnesses, with a very high defective rate. The high defective rate seriously affects the installation and function of the wire harness, and may cause function failure of the wire harness in severe cases.

However, for three kinds of positioning devices 5 of the integrally injection molded wire harness, the number of the wire harnesses with positioning size deviation of the positioning device 5 accounts for only 0%, 1% and 1% of the total number of the wire harnesses respectively, and the number of the wire harnesses disconnected accounts for 0% of the total number of the wire harnesses. Therefore, in the integrally injection molded wire harness, the positioning device 5 is more firmly combined with the wire harness, the positioning device 5 is not easy to fall off, and the positioning effect is better. Even in a relatively harsh vibration environment, the positioning function failure of the wire harness caused by the positioning size deviation of the positioning device 5 or the disconnection of the wire harness rarely occurs, which can significantly prolong the service life of the wire harness.

In order to demonstrate the protection levels of the sealing devices 4 in the wire harness processed by the conventional method and in the integrally injection molded wire harness according to the First, Second, and Third Embodiments of the present disclosure against external dust and water attack, 100 of the two kinds of wire harnesses are selected respectively, and the protection level of the sealing devices 4 of the two kinds of wire harnesses are tested. The results are shown in the table below.

TABLE 3

The passing ratios of protection level of the sealing devices in the conventional wire harness and the integrally injection molded wire harness

| Conventional wire harness | | | | | | Integrally injection molded wire harness | | | | | |
|---|---|---|---|---|---|---|---|---|---|---|---|
| Sealing of via hole on partition plate | | Sealing of terminal and conductor | | Sealing of sheath | | Sealing of via hole on partition plate | | Sealing of terminal and conductor | | Sealing of sheath | |
| IP54 | IP67 | IP54 | IP67 | IP54 | IP67 | IP54 | IP67 | IP54 | IP67 | IP54 | IP67 |
| 89% | 68% | 92% | 75% | 88% | 71% | 100% | 99% | 100% | 100% | 100% | 100% |

As can be seen from the above Table, in the protection level test of IP54, the passing ratios of three kinds of sealing devices 4 in the conventional wire harness are only 89%, 92% and 88% respectively, and in the protection level test of IP67, the passing ratios are only 68%, 75% and 71% respectively, thus the low passing ratios of the protection level makes it impossible to ensure the sealing performance of the wire harness or to prevent the corrosion of the conductor 2 by dust and water from the external environment, which will causes function failure of the wire harness.

In the protection level test of IP54, the passing ratios of three kinds of sealing devices 4 of the integrally injection molded wire harness are totally 100%, and in the protection level test of IP67, the passing ratios are 99%, 100% and 100% respectively, which fully satisfy the sealing performance requirement of the wire harness, make the sealing performance of the wire harness better, prevent dust and water in the external environment from corroding the conductor, and remarkably improve the service life of the wire harness.

In order to demonstrate the influence of wrapping the conductor connection points in different ways on the risk of breakage of the conductor connection points of the wire harness processed by the conventional method and the integrally injection molded wire harness according to the First, Second, and Third Embodiments of the present disclosure, 100 of the two kinds of wire harnesses are selected respectively, then a 120 hours of vibration experiment is performed on the two kinds of wire harnesses respectively, and then the breakage ratios of the conductor connection points are measured. The results are shown in the table below.

TABLE 4

The breakage ratios of the conductor connection points of conventional wire harness and the integrally injection-molded wire harness

| Conventional wire harness | | Integrally injection molded wire harness |
|---|---|---|
| Conductor connection points are wrapped with an adhesive tape | Conductor connection points are wrapped with a heat shrink tubing | Conductor connection points are wrapped by injection-molding |
| 26% | 18% | 0% |

As can be seen from the above Table that there are two ways of wrapping the conductor connection point of the conventional wire harness. After the wire harnesses are subjected to the 120 hours of vibration experiment, the breakage ratio of the conductor connection points wrapped with an adhesive tape is 26%, and the breakage ratio of the conductor connection points wrapped with a heat shrink tubing is 18%. This shows that the breakage ratio of the conductor connection points is high, which cannot guarantee the electrical conductivity of the wire harness in harsh vibration environment, resulting in a great risk of function failure of the wire harness.

However, the breakage ratio of the conductor connection points wrapped by injection molding of the injection molded wire harness is 0%, which can completely meet the conduction performance requirement of the wire harness in the harsh vibration environment, and remarkably improve the service life of the wire harness.

The above embodiments are only exemplary embodiments of the present disclosure, and the scope of protection of the present disclosure is not limited thereto. Any non-essential changes and substitutions made by those skilled in the art on the basis of the present disclosure are within the scope of the claimed invention.

The invention claimed is:

1. An injection molded wire harness comprising a terminal and at least one conductor, wherein one end of the terminal is used to be connected to an electrical circuit of an electrical device, and the other end of the terminal is connected to the conductor;

the wire harness is provided with a protective layer which is injection molded and wraps the conductor, at least one positioning device that is injection molded for fixing the position of the wire harness, and at least one sealing device that is injection molded for waterproofing;

the wire harness comprises more than two conductors, some of the conductors that extend in two different directions are connected by crimping or welding to form a conductor connection point for current shunting, the conductor connection point is located between the sealing device and the positioning device, the conductor connection point is entirely sealed by a wire harness protection device, and the protective layer wraps the more than two conductors;

the wire harness protection device, which is injection-molded separately from the protective layer, is located on an inner side of the protective layer.

2. The injection molded wire harness according to claim 1, wherein an insulation layer is arranged outside the conductor, and the protective layer is injection molded outside the insulation layer.

3. The injection molded wire harness according to claim 1, wherein the positioning device comprises a first fixing device connected to the wire harness, and a fitting device matched and connected with a mounting end for installing the wire harness, with the fitting device being connected to the first fixing device.

4. The injection molded wire harness according to claim 3, wherein the first fixing device is a cylindrical structure, and an inner wall of the cylindrical structure is fitted with an outer surface of the protective layer and wraps the outer surface of the protective layer.

5. The injection molded wire harness according to claim 3, wherein the fitting device is a columnar structure having an inverted tooth structure on the outer periphery of the columnar structure.

6. The injection molded wire harness according to claim 3, wherein the fitting device comprises a clip-shaped structure.

7. The injection molded wire harness according to claim 6, wherein the clip-shaped structure is provided with a groove in which barbs are arranged on both inner side walls.

8. The injection molded wire harness according to claim 3, wherein the fitting device comprises a circular ring structure or a C-shaped ring structure.

9. The injection molded wire harness according to claim 3, wherein the positioning device is a plastic member processed by injection molding.

10. The injection molded wire harness according to claim 1, wherein the sealing device comprises a second fixing device connected to the wire harness, and a waterproof device, one end of which is connected to the second fixing device.

11. The injection molded wire harness according to claim 10, wherein the second fixing device is a cylindrical structure, and an inner wall of the cylindrical structure is fitted with an outer surface of the protective layer and wraps the outer surface of the protective layer.

12. The injection molded wire harness according to claim 10, wherein the sealing device is a rubber member processed by injection molding.

13. The injection molded wire harness according to claim 1, wherein the wire harness is further provided with at least one sheath that is mutually inserted with an electrical device, and the terminal is fitted in a corresponding hole of the sheath.

14. The injection molded wire harness according to claim 13, wherein the sheath is integrally injection molded onto at least the terminal.

15. The injection molded wire harness according to claim 1, wherein the conductor is a solid conductor, a flat conductor, or a conductor composed of multiple strands of wire.

16. A method of preparing the wire harness according to claim 1, comprising:

A. preparing a semi-finished wire harness;

B. putting required raw materials into an injection molding equipment and drying them, then putting the semi-finished wire harness prepared in the step A into an injection mold; or putting the semi-finished wire harness prepared in the step A into an injection mold, and then putting required raw materials into an injection molding equipment and drying them;

C. starting the injection molding equipment to heat and melt the raw materials, and injecting the raw materials into the injection mold for molding;

the semi-finished wire harness comprises more than two conductors, and the step of preparing the semi-finished wire harness comprises: connecting some of the conductors that extend in two different directions by crimping or welding to form a conductor connection point for current shunting;

the method further comprises:

forming a wire harness protection device by injection molding firstly in accordance with the step B to the step C to seal the entire conductor connection point, then forming the protective layer by injection molding to wrap the more than two conductors in accordance with the step B to the step C, and finally forming the positioning device and the sealing device by injection molding in accordance with the step B to the step C, wherein the conductor connection point is located between the sealing device and the positioning device, and the wire harness protection device is located on an inner side of the protective layer.

17. The method according to claim 16, wherein, the method further comprises one of:

when the semi-finished wire harness is provided with a sheath, the terminal connected to the conductor is inserted into a corresponding hole of the sheath, and then an injection molding is performed; or the semi-finished wire harness is injection molded firstly, and then the terminal connected to the conductor is inserted into a corresponding hole of the sheath;

and the semi-finished wire harness is put into the injection mold, and a sheath is integrally injection molded onto at least the terminal.

18. The injection molded wire harness according to claim 1, wherein the sealing device comprises a second fixing device and a waterproof device, one end of which is connected to the second fixing device;

the sealing device is provided between the protective layer, the conductor and the terminal of the wire harness to seal, and wraps the protective layer, the conductor and the terminal;

the sealing device is injection molded on the conductor, on a connection position between the terminal and the conductor, and on the outside of the protective layer; a portion of the sealing device corresponding to the conductor and the terminal is the waterproof device, and a portion of sealing device corresponding to the protective layer is the second fixing device;

the second fixing device is a cylindrical structure, and an inner wall of the cylindrical structure is fitted with an outer surface of the protective layer and wraps the outer surface of the protective layer.

19. The injection molded wire harness according to claim 13, wherein the hole of the sheath comprises a first hole segment, a second hole segment, and a third hole segment arranged sequentially along an axial direction of the sheath, wherein a diameter of the second hole segment is greater than a diameter of the first hole segment and greater than a diameter of the third hole segment;

the terminal comprises a first terminal segment and a second terminal segment, wherein a diameter of the second terminal segment is greater than a diameter of the first terminal segment, the first terminal segment is located within the first hole segment, and the second terminal segment is located within the second hole segment;

the conductor comprises a conductor body and a conductor end portion, wherein a diameter of the conductor end portion is greater than a diameter of the conductor body, the conductor body passes through the third hole segment, and the conductor end portion is located within the second hole segment and inserted into the second terminal segment.

20. The injection molded wire harness according to claim 19, wherein the sheath completely encloses and wraps the terminal.

* * * * *